US010880252B2

(12) United States Patent
Gauglitz et al.

(10) Patent No.: US 10,880,252 B2
(45) Date of Patent: *Dec. 29, 2020

(54) SYSTEMS AND NETWORKS TO AGGREGATE PHOTO CONTENT FOR HEURISTIC AD TARGETING

(71) Applicant: PicPocket Labs, Inc., Austin, TX (US)

(72) Inventors: Wolfram K. Gauglitz, Austin, TX (US); Joshua M. LeBeau, Albany, CA (US); Paul A. McDonald, Staten Island, NY (US); Shanmugapriyan Devaraj, Portland, OR (US)

(73) Assignee: PicPocket Labs, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,011

(22) Filed: Dec. 27, 2019

(65) Prior Publication Data

US 2020/0213260 A1 Jul. 2, 2020

Related U.S. Application Data

(63) Continuation of application No. 15/493,043, filed on Apr. 20, 2017, now Pat. No. 10,574,614, which is a
(Continued)

(51) Int. Cl.
*H04L 12/58* (2006.01)
*H04W 4/021* (2018.01)
(Continued)

(52) U.S. Cl.
CPC ............. *H04L 51/20* (2013.01); *G06Q 10/10* (2013.01); *G06Q 30/0252* (2013.01);
(Continued)

(58) Field of Classification Search
CPC ........ H04L 67/22; H04L 51/00–51/20; H04W 4/20–4/33; H04W 4/02–4/029; G06Q 10/10; G06Q 30/0251–30/0267
See application file for complete search history.

(56) References Cited

U.S. PATENT DOCUMENTS

2016/0098851 A1* 4/2016 Wu .................. G06T 11/60
345/634
2018/0315076 A1* 11/2018 Andreou ............ G06Q 30/0244

* cited by examiner

*Primary Examiner* — Clayton R Williams
(74) *Attorney, Agent, or Firm* — Christopher Paradies; Paradies Law P.A.

(57) ABSTRACT

A system for aggregating media is provided which includes a server equipped with a processor and memory and having an event database associated with it which contains a plurality of events, wherein each of the plurality of events has a temporal window and geofence associated with it; and a plurality of users, each having associated therewith a mobile technology platform equipped with a display and a memory which communicates with the server. The memory of each mobile technology platform has an instance of a software application is installed which monitors the current location of the user, prompts the user to check into events present in the event database when the user enters a geofence associated with an event within the temporal window associated with the event, associates, with one of the plurality of events, media which was captured by the user while the user was checked into the one of the plurality of events and within the temporal window and geofence associated with the one of the plurality of events, and uploads the captured media to the server.

20 Claims, 3 Drawing Sheets

Related U.S. Application Data continuation-in-part of application No. 15/363,070, filed on Nov. 29, 2016, now Pat. No. 10,856,115, which is a continuation of application No. 13/833,991, filed on Mar. 15, 2013, now Pat. No. 9,544,379, which is a continuation-in-part of application No. 12/849,780, filed on Aug. 3, 2010, now abandoned.

(60) Provisional application No. 61/231,008, filed on Aug. 3, 2009.

(51) Int. Cl.
| | |
|---|---|
| *G06Q 30/02* | (2012.01) |
| *G06Q 50/00* | (2012.01) |
| *G06Q 10/10* | (2012.01) |
| *H04L 29/08* | (2006.01) |
| *H04W 4/21* | (2018.01) |
| *G06Q 30/06* | (2012.01) |

(52) U.S. Cl.
CPC ......... *G06Q 30/0267* (2013.01); *G06Q 30/06* (2013.01); *G06Q 30/0641* (2013.01); *G06Q 50/01* (2013.01); *H04L 51/32* (2013.01); *H04L 67/22* (2013.01); *H04W 4/021* (2013.01); *H04W 4/022* (2013.01); *H04W 4/21* (2018.02); *G06Q 30/0255* (2013.01); *G06Q 30/0621* (2013.01)

SYSTEMS AND NETWORKS TO AGGREGATE PHOTO CONTENT FOR HEURISTIC AD TARGETING

CROSS REFERENCE TO RELATED APPLICATIONS

The present application is a continuation of U.S. Ser. No. 15/493,043 (Gauglitz et al.), entitled GEOFENCING OF OBVIOUS GEOGRAPHIC LOCATIONS AND EVENTS, which was filed on Apr. 20, 2017, and which is incorporated herein by reference in its entirety; which is a continuation-in-part of U.S. Ser. No. 15/363,070 (Gauglitz et al.), entitled "SYSTEMS AND METHODS FOR EVENT NETWORKING AND MEDIA SHARING," which was filed on Nov. 29, 2016, and which is incorporated herein by reference in its entirety; which is a continuation of U.S. Ser. No. 13/833,991 (Gauglitz et al.), entitled "SYSTEMS AND METHODS FOR EVENT NETWORKING AND MEDIA SHARING," which was filed on Mar. 15, 2013 and issued as U.S. Pat. No. 9,544,379 on Jan. 10, 2017, and which is incorporated herein by reference in its entirety; which is a continuation-in-part of U.S. application Ser. No. 12/849,780 (Gauglitz), filed on Aug. 3, 2010, entitled "SYSTEMS AND METHODS FOR EVENT NETWORKING, MEDIA SHARING, AND PRODUCT CREATION," now abandoned, which is incorporated herein by reference in its entirety; which claims priority from U.S. Provisional Application 61/231,008, filed on Aug. 3, 2009, having the same title and inventor, and which is incorporated herein by reference in its entirety.

FIELD OF THE DISCLOSURE

The present disclosure relates generally to photography and imaging, telecommunications, social media, and event networking in a variety of fields including sports and other community events, personal events, and other occasions in which the sharing of information and media is desirable. More particularly, the present disclosure relates to the use of various communications protocols and platforms in order to distribute information through a network to enable users to interact and communicate with like-minded users, as well as to enable the creation and purchasing of items and customized products.

BACKGROUND OF THE DISCLOSURE

Social networking through the internet has exploded of late due to the internets inherent ability to permit communication among users. Various standard protocols have allowed for information and resource exchange through email, bulletin boards, chat rooms, and the like, for many years, however, more recent advances in mobile technology now permit people to exchange information via their mobile phones and tablets that heretofore could take place only while sitting at a desktop, laptop, or notebook computer.

Web-based networking now exists in the form of such sites as MySpace®, Facebook®, LinkedIn®, Twitter®, Pinterest®, Instagram®, and many others. In such networking sites, users generally join, provide such details as contact information, and optionally include information related to a variety of interests. The sites maintain all information of all users in central servers operably connected to databases, such that users can find each other, establish links to each other, and establish communities of users.

Some social networking sites provide the ability to search for friends, i.e., other users which may already be known to a particular user, or other users who share some commonality in education, employment, or other fields of interest. Users may interact with such friends by posting information to each other's pages maintained on the site, by joining in community interactions such as those provided by applications on sites such as Facebook®. or through direct message services and email clients such as those offered by both Facebook and Twitter.

Some online services offer forums for communication between communities of users or in a one to many broadcast format. These services include message boards, email lists, chat rooms, personal home pages, web logs or blogs and tweets. See, for example, U.S. Pat. Nos. 6,366,962 and 6,363,427. These services provide a forum where profiles or messages are viewed by a specific individual, the general public, or the entire membership of a specific defined group.

These types of forums allow visibility to multiple members of a group; however, they typically are not based on events or social networks, but rather on broader interests, such as a particular hobby or sport.

U.S. Pat. No. 6,519,629 discloses, among other things, a system designed to distribute, initiate and allow interaction and communication within like-minded communities of users.

U.S. Pat. No. 6,618,593 discloses a system designed to "match" users using their mobile phones, which may use location and other information to determine such matching.

U.S. Pat. No. 7,047,202 discloses, among other things, a method and apparatus for users to search networks, both their own network and their peers' networks, all under the umbrella of what the inventors therein call a "multiple level access" security system.

U.S. Pat. No. 7,069,308 discloses, among other things, a networking system wherein descriptive data and relationship data are integrated and processed to reveal a series of social relationships connecting any two users within a social network.

U.S. Pat. No. 7,305,233 discloses, among other things, a system wherein images are uploaded to a central server, which system permits printing and delivery of such images.

US Patent Application Publication No. 2002/0065741 discloses, among other things, a system wherein images selected by a user may be uploaded, and cards with selected images may be distributed to selected recipients.

In the general field of sports, for example, there are many websites of general interest, such as news organizations, and there are those dedicated to the field, which provide a variety of information, such as scores, text descriptions, video clips, photos of games, etc. There are also sites which provide users with games, such as fantasy football, hosted by the site and existing only in cyberspace. Information on local events may be found on the websites for local municipalities, news organizations, sports leagues, etc.

Notwithstanding the myriad sites available for accessing information, none to date provide the ability for users to share media obtained at a sporting event, in real time, such that all users participating in a live event, and those who only take interest at some later time, have access to the combined media from all participants in a customizable manner. The advent of mobile devices capable of reaching the internet, GPS, and audiovisual recording has made it possible to record information at an event and have it be uploaded to a server in essentially real-time. The newest mobile devices, such as the iPhone®, Android®, and Blackberry®, are particularly suitable for the purposes of the present disclosure because they are capable of having applications installed which directly interface with the website servers contemplated by the present disclosure.

No existing methods take advantage of this ability to provide all similarly situated users a shared, continuously updated community view of an event. Nor do they provide the ability to create hard-copy records and images of such events including images originally captured by other users, obtainable merely by ordering same, whether during the event, immediately thereafter, or any time after the event has completed. Nor do they provide an ability to offer or suggest products or advertising to these same users which is relevant and related to a particular event. The art is in need of such systems and event-based networking tools.

SUMMARY OF THE DISCLOSURE

Figure 1:
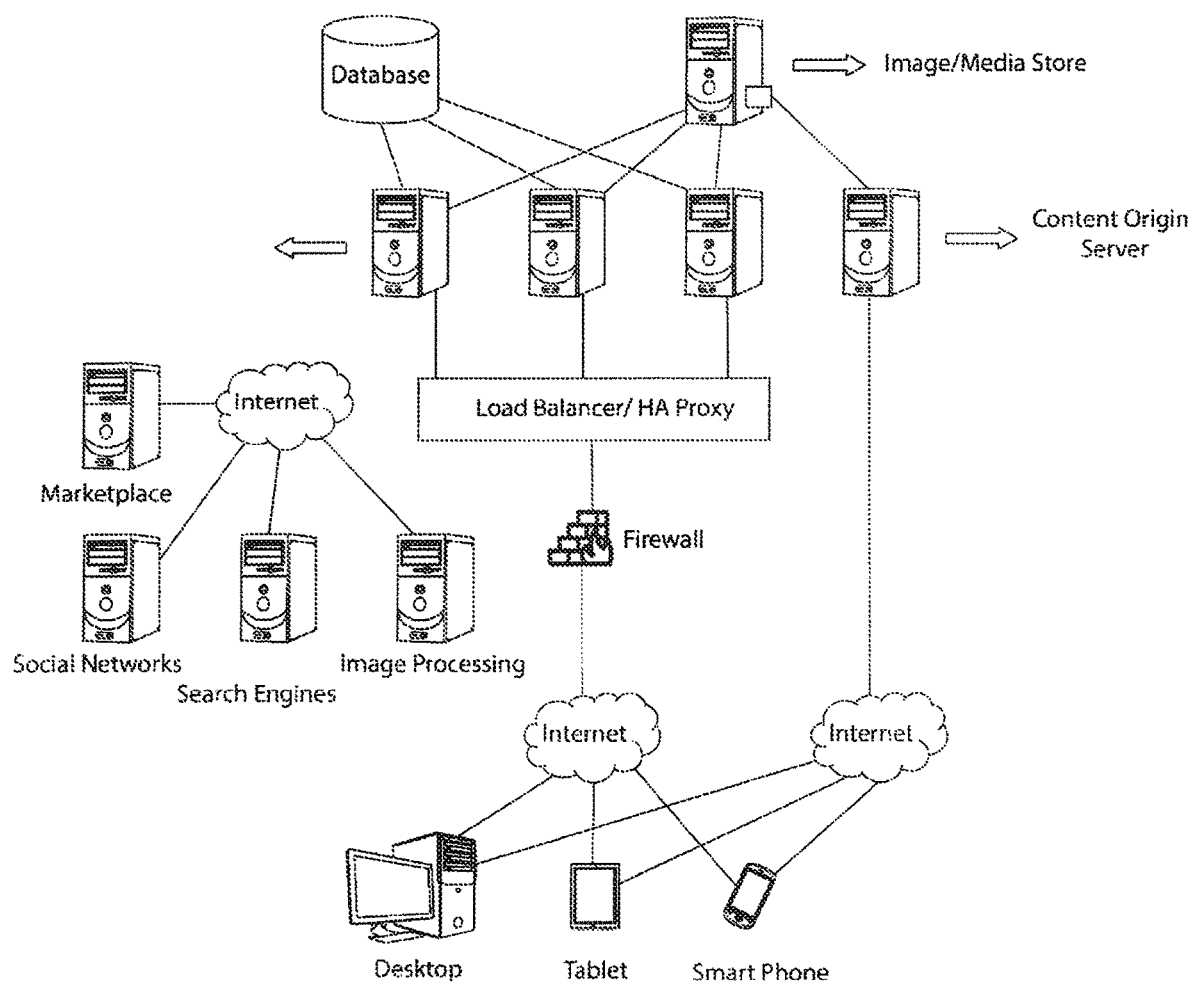
FIG. 1 is a schematic cartoon of an embodiment of the present disclosure illustrating the network architecture and structure of the system.

It is an object of the present disclosure to overcome the drawbacks of the prior art. The systems and methodologies of the present disclosure provide the ability not only to generate communities of users, but also to aggregate media (photos, video, audio, and the like) from such communities of users, thus enabling the sharing and distribution of such media to all the users thereof. Each user may choose to share all or only a selection of media captured, while the aggregate for any particular event may be available to all users.

In a preferred embodiment of a system disclosed herein, each end user of the system generally creates and manages his or her own page, accessible by logging into the system via the Internet, in which page the user collects a variety of events selected from those generally available to all users, as well as those created by each individual user. Thus, in one aspect of the present disclosure, the system itself provides and updates a database of events accessible to all users, such as professional sporting events, real estate listings from real estate companies, product offerings from image finishing companies, retailers, and other commercial retail companies. Advertising on each user's page may be customizably placed, and may be tailored to a user's selected fields of interest as identified by such user's choices of events, prior viewing, purchasing habits, or other markers gained through application of predictive intelligence.

Some of the advantages of the systems and methodologies disclosed herein may be appreciated by considering the typical experience of a fan attending a big sporting event. Frequently, such a fan hopes to leave the game with a beautiful image of his favorite player, or a key shot of the action. Unfortunately, it frequently happens that the fan leaves with little more than a handful of shots, only a few of which may be "keepers". Moreover, most or all of the images captured by the fan are typically taken at roughly the same angle and distance from the object(s) of interest. If fans could easily share all their images, the number of keepers available to a fan would increase, and the probability of capturing an action shot that the fan is looking for may rise as well. In a preferred embodiment, the systems and methodologies disclosed herein promote the collection of a wide variety of images and other media from different angles and perspectives, and present users with the ability to, for example, create photographic products that they would otherwise be unable to obtain anywhere else.

The present disclosure also allows the offering and creation of products tailored and customized for end users. In a preferred embodiment, the systems and methodologies of the present disclosure begin with features commonly found in social networking applications, but provide the added ability to aggregate media captured by the entire community of users. These systems and methodologies may further facilitate the production and purchase of customized products such as T-shirts, enlargements of images, and other items as further described below. These products may be derived from the user's own images uploaded during the event, or they may be derived from other users of the system.

In one aspect, the present disclosure provides a system for event networking comprising a server having an event database of events, the events having a time window and a GPS location or geofence. The system has a plurality of users with access to the event database, and the system aggregates media uploaded by the users at an event into an event page. The event is controllably accessible to users such that the images in an event page are viewable by all users having access thereto.

In another aspect, the system aggregates media based on parameters such as, for example, the time window and the GPS location of the media. The media may be, for example, images, video, or audio content.

The time window may be specified with a start time and an end time, or with a start time and duration, or with an end time and duration. The GPS location is preferably defined by GPS coordinates and a geofence or proximity envelope around the GPS coordinates, such that the GPS location encompasses all GPS coordinates within the envelope. The proximity envelope or geofence may be a circle with a radius having a specified length, or may be irregular, being defined by the path through time of an event. Events may be entered into the event database by an operator of the system, or they may be created by the users. The users may have the ability to customize their home pages, and these home pages may show the events to which the user is subscribed, or a subset thereof. Additional content or events may populate users' pages as provided by the system, such as targeted advertising or events suggested by the system for each user.

In another aspect, a method for associating media with an event is provided. The method comprises (a) providing software, instances of which are installed on each of a plurality of mobile technology platforms, wherein each mobile technology platform is associated with one of a plurality of users, wherein each mobile technology platform is equipped with a display and is further equipped with a memory device in which an instance of said software is installed, and wherein said software (i) monitors the current location of the mobile technology platform, and (ii) captures media in response to at least one command input by a user, (b) creating a plurality of events, wherein each of the plurality of events has a geofence associated with it; (c) receiving, from the plurality of users, instances of captured media, wherein each instance of captured media was captured on a mobile technology platform associated with one of the plurality of users, and wherein each instance of captured media is accompanied by a request to associate the instance of captured media with a designated event selected from the group consisting of the plurality of events; (d) for each instance of captured media, ascertaining the attendance of the associated user at the designated event by comparing the time and the location of the associated user with the temporal window and geofence associated with the designated event; (e) associating the instance of captured media with the designated event only if the associated user is attending the designated event; (f) aggregating the captured media associated with at least one of the plurality of events into a collection; and (g) providing access to the collection to the plurality of users.

In a further aspect, a method is provided for associating media with an event. The method comprises (a) providing a software application, instances of which are installed on each of a plurality of mobile technology platforms, wherein each mobile technology platform is associated with one of a plurality of users and is equipped with a display and a memory device; (b) receiving, from a first of the plurality of users, a request to create an event, wherein the request specifies a geofence and a temporal window to be associated with the event; (c) in response to the request to create an event received from the first of the plurality of users, creating the event; (d) receiving, from a second of the plurality of users, a request to associate an instance of captured media with the created event, wherein the at least one request to associate captured media is generated by the instance of the software application installed on the mobile technology platform associated with the second of the plurality of users in response to input received from the second of the plurality of users, wherein the captured media is captured with the mobile technology platform associated with the second of the plurality of users, and wherein the captured media is selected from the group consisting of videos and images; and (e) in response to the request received from the second of the plurality of users to associate the instance of captured media with the created event, (i) ascertaining the associated user's attendance at the created event by comparing the associated time and location at which the instance of captured media was captured with the temporal window and geofence associated with the created event, and (ii) associating the instance of captured media with the created event if, and only if, the instance of captured media was captured while the associated user was attending the created event.

In still another aspect, a method for associating media with an event is provided. The method comprises (a) providing software, instances of which are installed on each of a plurality of mobile technology platforms, wherein each mobile technology platform is associated with one of a plurality of users, wherein each mobile technology platform is equipped with a display and is further equipped with a memory device in which an instance of said software is installed, and wherein said software (i) monitors the current location of the mobile technology platform, and (ii) captures media in response to at least one command input by a user, (b) creating an event database containing a plurality of events, wherein each of the plurality of events has a temporal window and geofence associated with it; (c) receiving, from the one of said plurality of users, a request to modify an instance of media captured on the mobile technology platform associated with the one of said plurality of users; (d) ascertaining whether one of said plurality of users is attending one of said plurality of events by (i) comparing the location of the mobile technology platform associated with the one of said plurality of users with the geofence associated with the one of the plurality of events and (ii) comparing the current time with the temporal window associated with the one of the plurality of events; and (e) if the one of said plurality of users is attending the event, then (i) creating a modified version of the instance of media, and (ii) providing the one of said plurality of users with the modified version of the instance of media.

In yet another aspect, a method is provided for associating media with an event, comprising (a) providing software, instances of which are installed on each of a plurality of mobile technology platforms, wherein each mobile technology platform is associated with one of a plurality of users, wherein each mobile technology platform is equipped with a display and is further equipped with a memory device in which an instance of said software is installed, wherein said software (i) monitors the current location of the mobile technology platform, and (ii) captures media in response to at least one command input by a user, and wherein said plurality of mobile technology platforms includes a first mobile technology platform; (b) defining a geofence; (c) defining a temporal window; (d) creating a media template; (e) detecting the presence, within said geofence and during said temporal window, of said first mobile technology platform; (f) in response to the detection of the presence of said first mobile technology platform within said geofence and during said temporal window, displaying the media template on the display of said first mobile technology platform; (g) in response to the selection, by a user of said first mobile technology platform, of the template and of an instance of media captured by said first mobile technology platform, applying the template to the instance of captured media, thereby creating a modified version of the captured media; and (h) displaying the modified version of the captured media on the display of the first mobile technology platform.

In another aspect, a method is provided for capturing media at a venue. The method comprises (a) providing software, instances of which are installed on each of a plurality of mobile technology platforms, wherein each mobile technology platform is associated with one of a plurality of users, wherein each mobile technology platform is equipped with a display and is further equipped with a memory device in which an instance of said software is installed, and wherein said software monitors the current location of the mobile technology platform; (b) providing at least one venue camera which is adapted to capture media of a user at the venue; (c) receiving a request from a first of the plurality of users, via the software, to have media of the first user captured by the at least one venue camera; (d) obtaining the first user's location from the instance of software installed on the mobile technology platform associated with the first user; (e) directing the at least one venue camera to the first user's location; and (f) capturing media of the first user.

In a further aspect, a method is provided for aggregating data associated with an event. The method comprises (a) providing software, instances of which are installed on each of a plurality of mobile technology platforms, wherein each mobile technology platform is associated with one of a plurality of users, wherein each mobile technology platform is equipped with a display and is further equipped with a memory device in which an instance of said software is installed, and wherein said software (a) monitors the current location of the mobile technology platform, and (b) captures data in response to at least one command input by a user, (b) creating a plurality of events, wherein each of the plurality of events has a geofence associated with it; (c) receiving, from the plurality of users, instances of captured data, wherein each instance of captured data was captured on a mobile technology platform associated with one of the plurality of users; (d) for each instance of captured data, ascertaining the attendance of the associated user at the designated event, at the time that the data was captured, by comparing the time and the location of the associated user with the temporal window and geofence associated with the designated event; (e) associating the instance of captured data with the designated event only if it is ascertained that the associated user was in attendance at the designated event at the time that the data was captured; (f) aggregating the captured data associated with at least one of the plurality of events into a collection; and (g) providing access to the collection to the plurality of users.

In another aspect, a method is provided for associating media with an event. The method comprises (a) providing software, instances of which are installed on each of a plurality of mobile devices, wherein each mobile device is associated with one of a plurality of users, wherein each mobile device is equipped with a memory device in which an instance of said software is installed, and wherein said software (i) monitors the current location of the mobile device and (ii) captures media in response to at least one command input by a user, (b) creating a plurality of events, wherein each of the plurality of events has a geofence associated with it (c) receiving, from the plurality of users, instances of captured media, wherein each instance of captured media was captured on a mobile device associated with one of the plurality of users, and wherein each instance of captured media is accompanied by a request to associate the instance of captured media with a designated event selected from the group consisting of the plurality of events; (d) for each instance of captured media, ascertaining the attendance of the associated user at the designated event by comparing the time and the location of the associated user with the temporal window and geofence associated with the designated event; (e) associating the instance of captured media with the designated event only if it is ascertained that the associated user was in attendance at the designated event; (f) aggregating the captured media associated with at least one of the plurality of events into a collection; and (g) providing access to the collection to the plurality of users.

These and other objects are achieved through the present disclosure as exemplified and further described in the Detailed Description of the Invention below.

DETAILED DESCRIPTION

Introduction

The routine features of the systems and methodologies described herein are known to those of skill in the art and are therefore not shown and described. It will, of course, be appreciated that, in the development of any actual implementations of such systems and methodologies, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

Definitions

The term "social network", as used herein, refers to an aggregation of individual social relationships, out to any number of degrees of separation.

The term "user", as used herein, refers to an individual who has registered in the system.

The term "system", as used herein, refers to a computer system that serves informational content over a network using the standard protocols of the World Wide Web. As used herein, the term is generally intended to encompass both (i) the hardware/software server components that serve the informational content over the network, and (ii) the "back end" hardware/software components, including any non-standard or specialized components, that interact with the server components to perform services for website users.

The term "media", as used herein, refers to images, video, audio, and combinations thereof.

The term "mobile technology platform", as used herein, refers to a computational device which is designed to be carried with or on a person, which can run a mobile software application of the type described herein, which has the ability to capture media, and which is capable of communicating over a network. The term may also encompass multiple components or devices which, in the aggregate, perform as a mobile technology platform. Examples of mobile technology platforms include smartphones, such as Apple's iPhone® and Samsung's Android® devices, and wearable computational devices having the foregoing capabilities (such as, for example, camera-watches, head-mounted cameras, and other wearable devices which operate, by themselves or in combination with additional devices, to provide these capabilities).

Overview

Unlike other Internet and web-based social networking systems, the advantages of the present disclosure are found in its ability not only to generate communities of users, but to aggregate images and other media, and information provided by a plurality of users in the community, such that each user has access to a much larger collection of such media and information than that captured individually by each particular user. The users at an event may already be connected to each other, or may simply be co-participants at the event.

The system is also optionally adaptable to offer products comprising professionally enhanced images or media, tailored and customized for the end users and communities. Just as with known social networking systems, users may "meet" and interact via the website produced by the system. Thus, email, chat, bulletin boards, blogs, Sharing, Favoriting, Likes, Rating, Commenting and other typical forms of social networking are contemplated. The system may use information gathered about users and user behavior to create a recommendation engine that will suggest content and products that might be of particular interest to any given user. For example, if it is recognized that, in general, users who like photos of hikers also like photos of rock climbers, the system may inform a user who is viewing an event about hiking that the user might also like an event about rock climbing, and provide a link to such an event.

Another approach to making intelligent recommendations is to identify users who have similar viewing and voting patterns and make recommendations based on what other similarly situated users have liked. For example, if a user A and user B have both liked many of the same events, but user B has liked some events that user A has not voted on, the system might recommend some of user B's liked events to user A.

The system may use this same recommendation engine to help determine which products and advertisements appear on a particular user's or event's page. For example, if user A has liked several events near or about the Eiffel Tower, the system might recommend to user A a book about France or an advertisement for a Paris hotel even though the user is currently viewing an event that has nothing to do with France.

The system may also track in real time which products users are clicking on and use this data to help determine which products are being recommended for purchase. For example, if product X is suddenly getting a burst in its click through rate, the system will detect this increase and adjust the product recommendation algorithm so product X is displayed more often.

The present disclosure also adds the ability of purchasing products such as T-shirts, enlargements of images, and other items as further described below. Such products include the typical items one could purchase at a sporting event, but more importantly the products available to users of the system are products employing the collective community of users' images. Thus, the present disclosure allows for the production of customized products with enhanced images to be produced, sold, and delivered to users in a manner heretofore unavailable.

The System Hardware

In accordance with the present disclosure, the hardware and software components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present disclosure is generally described in relation to distribution of information via a network connection. For example, the back-end database may be housed at a remote location on any suitable computer hardware, with operable links to the front-end computer hardware, which ultimately serves information to, and collects information from, end users of the system of the present disclosure. Such hardware is now well known, and any suitable system may be employed, such as the hardware described in U.S. Pat. No. 7,069,308, the disclosure of which is specifically incorporated by reference in its entirety. Furthermore, parts of the system are also in communication with other service providers, over the internet, such that, for example, digital image files may be sent to such service providers for output on hardcopy, such as prints.

Figure 2:
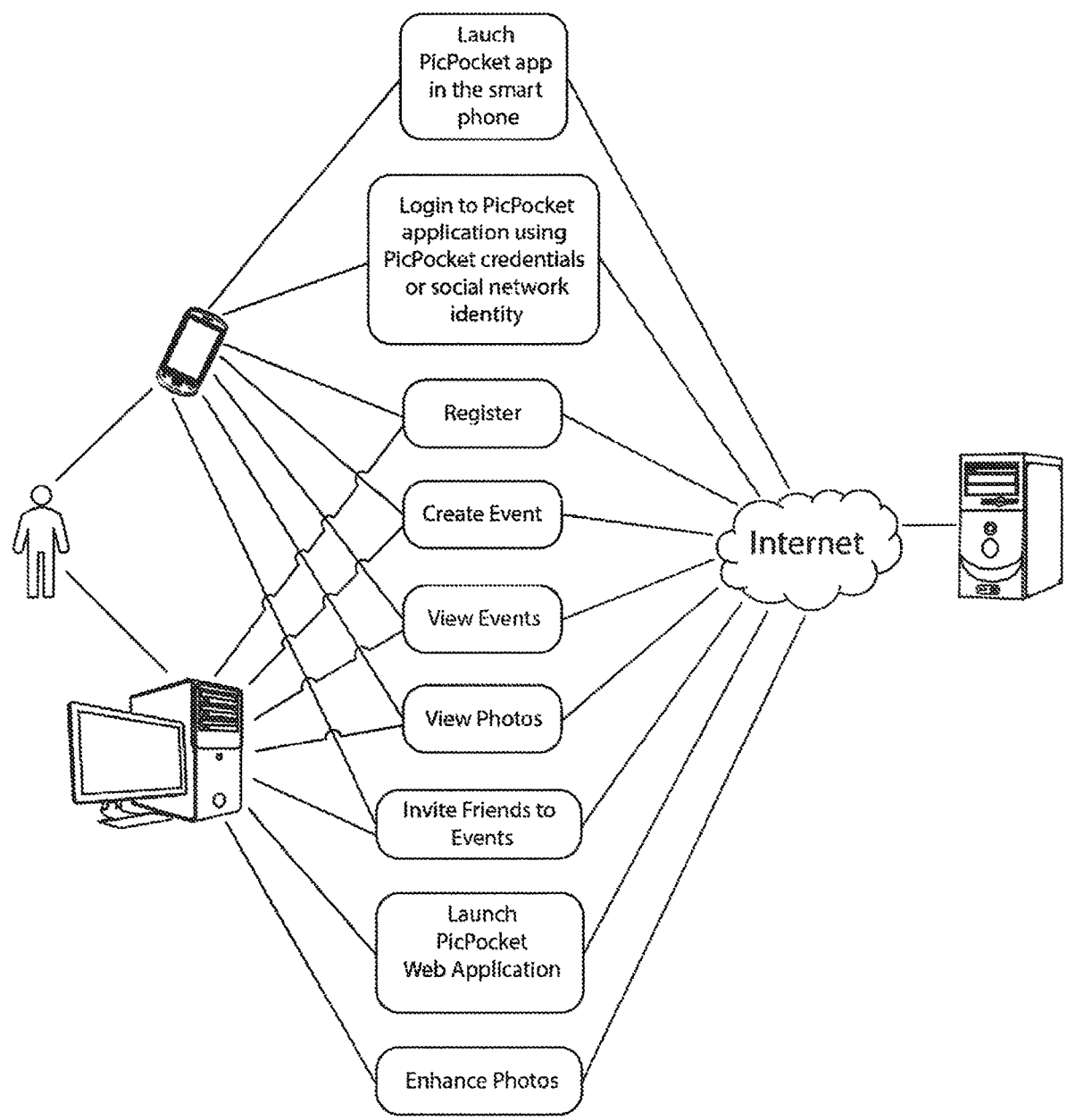
FIG. 2 is a schematic diagram illustrating general use of an embodiment of the system named PicPocket® including, among other things, event creation.
Figure 3:
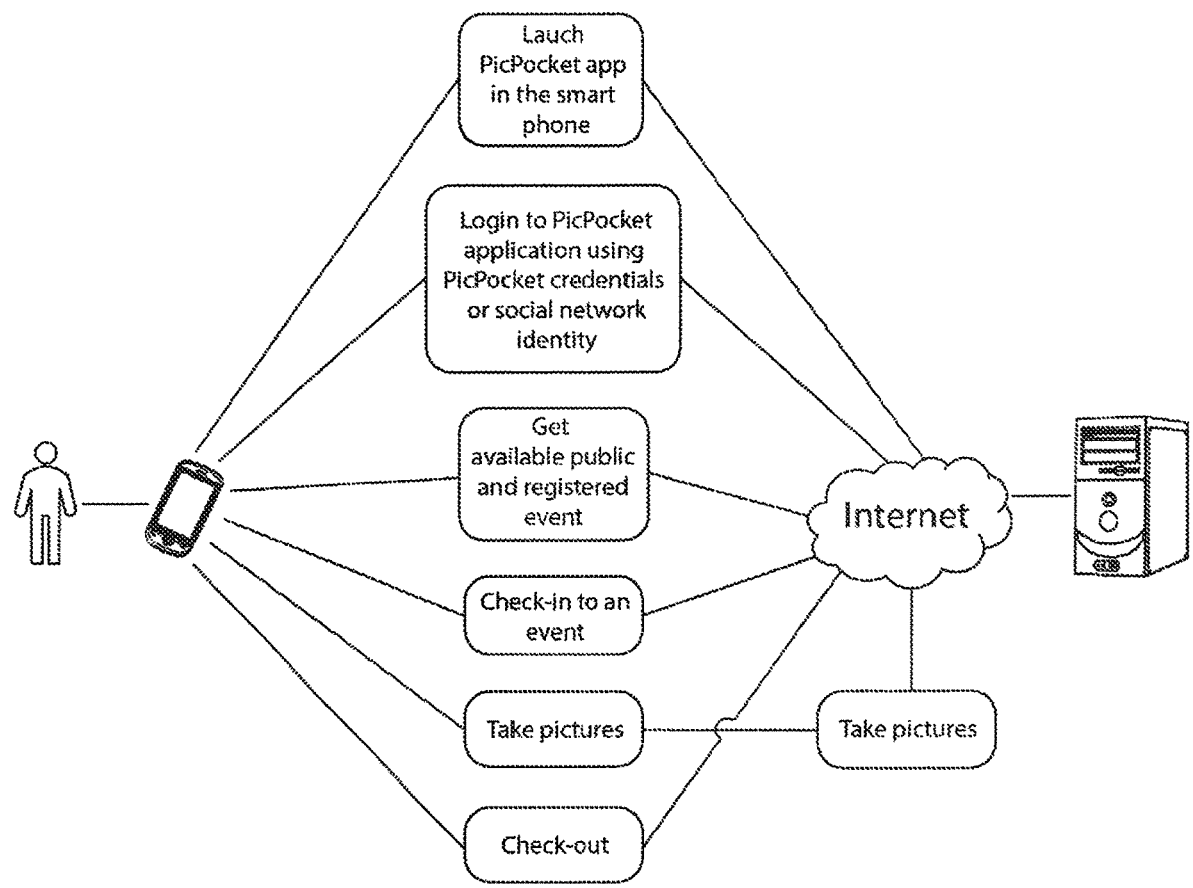
FIG. 3 is a schematic diagram illustrating general use of an embodiment of the system named PicPocket® including, among other things, image capture and upload to the system.

As shown in FIGS. 1-3, illustrating embodiments of the present disclosure, the system architecture utilizes Linux or other operating systems running on Intel Xeon or similar processors. The architecture employs multiple node web application clusters for high availability and scalability. The images captured and uploaded by the users are stored in a high speed file store or network store or cloud data store for easy storage and retrieval operations. The architecture also employs high availability proxy or load balancer for fail over and fault tolerance capabilities. The content delivery network may cache previously delivered content for faster access by users. User information events, photos, preferences, and other elements of the system are typically stored in an RDBMS (relational database management system). The mobile app employed by the system also may use image enhancement, social network integration (e.g., with Facebook and others) and taxonomy management to provide a rich user experience.

Image Capture Devices

The systems and methodologies disclosed herein may be practiced with a variety of suitable devices, such as Apple's iPhone®, RIM's Blackberry®, Android® phones, and other so-called "smart" phones. However, any mobile device capable of capturing images could be used. For example, it is contemplated that other devices include laptop computers with built in cameras, "netbook" computers with cameras, simple camera phones, tablets, digital cameras, digital SLR cameras, etc. Film/slide cameras may also be included as devices useful for the system, provided that users upload digitized versions of such images following film processing.

In another embodiment, a device for use in the system may be designed specifically for use in the system, such that it is capable of at least image capture, but optionally also capable of interfacing with the system via a network, whether using a traditional browser or a custom application or app specifically designed for the purpose of implementing the event networking system of the present disclosure.

Users may view events on their computers, mobile devices, and even on televisions. Output to television is possible by direct connection or wireless connection from a computer, but also such devices and systems such as TiVo®, Roku®, AppleTV® and the like may be adapted with custom channels capable of interfacing with the system of the present disclosure such that users may view events directly on their televisions.

Registration and Events

In outline, the system of the present disclosure operates as follows. Users register with the system via a website, or as prompted upon launching an application on their mobile device, at which they provide basic information including name and address, billing information, and the like. Also at the time of registration, or any time thereafter, users may identify and select classes of events and/or particular events and/or particular users they would like to follow. Such identification can be performed through searchable lists of events provided by the system based on correlation with the user's geographic location as specified by the user. Users may register at home from the desktop, from which they may provide this location and selection information directly on a registration page. Alternatively, they may supply certain information, such as GPS information, via the use's mobile interfacing application, such as an application residing on an iPhone® or Android® device. Selection of event classes and particular events may occur at any time post-registration as well. Users may also select events that are not already presented in the database through an "add-event" style page accessed from the website or the application on the device.

Events include professional and other major sports team games, such as those of the National Football League, Major League Baseball, the National Hockey League, the National Basketball Association, the United States Tennis Association, and others, both domestic and foreign. Additionally, a variety of other national league sports teams, minor league sports teams, college sports teams, and games of local teams such as intramural and intermural teams, and little league teams are amenable to the system. In one embodiment, the event is a concert, show, or other public performance. More and more municipalities have cameras installed which would be capable for use in the system. Thus, other municipal and local events, such as parades, town fairs, and the like may be considered events. Additional other events may also be included in the systems and methodologies disclosed herein, including unscheduled events, such as on-scene images of a local fire. Essentially any event for which images can be captured can be shared using the system of the present disclosure, because images thereof will be viewable, and purchasable, by registered users or organizations.

Once an event or class of events is selected, the user's page on the site (whether viewed directly over the internet in a browser or in a mobile application interface) will update with information about upcoming events. For a fan of a particular team, for example, upcoming games will be displayed on the user's page, as well as related information from the sport, with access to other teams, scores, etc.

In one embodiment of the present disclosure, the system provides a global list of events presented from a database collected by operators of the system. For example, all major sporting events from professional sports may be added to a user's page. The system collects images from all users uploading images from each event, such that any user that has chosen that event may view all the images collected for that event by all user's attending that event. Each attendee may choose to have all images uploaded, or may specify particular images to be uploaded.

The system may implement a checking operation by which all images uploaded for an event are checked to ensure that the GPS coordinates (and time and date) for the image are within the area in which the event is taking place. This checking operation prevents images that were not actually taken at the event from appearing in the event's page. In the case of digital SLR images that are captured without any GPS meta data, the system may use a method whereby a user establishes their bona fides by checking-in to the event which then could be deemed to satisfy the requirements for a photo being considered for inclusion within an event's event page.

In addition to sporting events, the events of governmental entities such as states, counties, and municipalities may be provided globally by the system. For example, state fairs, county fund-raising events, and a town's music festival are all events which may be available to users of the system. Indeed, any event generally known to the public may be added by the operators of the system, enabling users to "attend" the event by adding it to their pages; those that attend may upload images to the aggregated image collection for that event, while those who were unable to attend will also be able to view images from the event by simply adding it to their page.

Each user may also create personal customized events. For example, a user having a birthday party for a child may create an event for the party, and notify attendees that are also users of the system that the event is available. Attendees who at the time of the party are not users of the system would have the ability to download the app from the Apple iTunes or Google Play stores (or other sources of apps) and enter a passcode which grants them access to the event should it be restricted. All images taken at such an event are then aggregated as described herein, and all attendees may then view all the images of the event. The user creating the event is provided with tools to control sharing and access by other user's to such "owned" events.

GPS may also be coupled with date and time information to be used to automatically collect images for an event even when users have not specifically directed images to a previously defined event. For example, all images uploaded to the system which fall within a specified radius of an unknown event may be classified and collected as related to an event taking place at such location, the definition of the event being provided once details are known about the event. For example, a fire, or a traffic accident, may generate uploads of images within a discrete radius and within a discrete period of time. The system may be provided with an algorithm that recognizes such spontaneous concentrations of images, and operators of the system may be alerted to such concentrations, such that the event may be classified and made available to users of the system. Conversely, after an event is known to have occurred at a certain location on a certain date and time, the system is also be provided with an algorithm that actively searches for image content with particular metadata indicating coincidence with the event.

In an additional embodiment, GPS allows for the creation of persistent yet dynamically updating events. For example, all images taken in a particular neighborhood may be aggregated as an event entitled with the name of such neighborhood. Residents and visitors, and those considering moving to the neighborhood, may have interest in such "events" and may choose to browse or retain such events on their pages. Each user's page may be provided with a map, or a link to a map, in which the user may simply select a geographic location and specify a radius to see all events taking place or that have taken place in such area, including such persistent neighborhood events. It will be appreciated that this may be of particular interest to a real estate application where a home purchase decision is driven as much by the community and neighborhood one is buying into as it is the home or property itself.

Images may also appear in more than one event. For example, an image appearing in a neighborhood event may also have been taken at the time of a sporting event, in which case it may appear in both events, and may be linkable to both events.

Location based events have been described using a radius within which all images uploaded are considered to be part of a discrete event. However, the ability to customize a geographic location using intelligent boundary drawing, rather than a simple center and radius around such center, is also envisaged to be part of the present disclosure. Thus, users may draw freeform geographic boundaries on a map in order to define regions of interest as they browse events. This is particularly useful when the region under examination is not a circle—for example, a neighborhood may be largely rectangular or oddly shaped. Such ability to construct boundaries allows users to customize areas of interest. This is particularly useful when the event itself has irregularly shaped boundaries, for example, the New York City Marathon, and the Macy's Thanksgiving Day Parade.

Events need not be added to a user's page permanently-users may browse events by searching using a search engine embedded in the system, thereby enabling viewing of events on an ad hoc basis rather than including the event on the user's page itself Those events of interest, however, may be added to the user's page at any time.

Implementation of tailored directed advertising is suitable for use in the systems and methodologies disclosed herein. For example, a user considering moving to a neighborhood might begin on the system by selecting the location on a map, setting a radius for the neighborhood, and viewing the aggregated images for that neighborhood. But on that neighborhood event page a real estate company having listings for homes in the neighborhood may have an advertisement that appears on such a page, offering the user lists of homes as well as images of each home.

In one embodiment, for example, a real-estate company with access to information relating to properties for sale or lease, may also create customizable dashboard views which load homes and properties of interest by any number of customizable and potentially pre-set groupings such as 'neighborhood', 'price range' or 'distance from' selected points of interest such as schools, parks, hospitals, restaurants or shopping districts.

In another embodiment, advertising for products may also appear in the pages of events themselves. Thus, on an event page for an NFL football game, among the images taken by users, professional photographers, and the stadium operators, there may be similarly sized images which link to purchase pages for products such as hats, shirts, photos and the like for the teams playing in that event or any other products which are somewhat related to the category of event itself (i.e. a football, lawn chairs, coolers, etc.).

In another embodiment, the system is capable of creating "landmark" events. For example, a landmark such as the Eiffel Tower in Paris, France may be provided as an event which shows images taken within a desirable distance of the landmark regardless of the time at which the image was captured. Users can use an iPad, for example, to create a "photo frame" that updates every time a new photo comes in. Use a user's photo and event votes to deliver targeted ads. (e.g., where a user has liked several photos of the Eiffel Tower, show them an ad for a book about Paris, or a poster, or a trip to France).

Landmark based photo aggregation would allow users to create personalized "channels" that would display a constantly updating stream of photos of a specific landmark. For example a user who likes photos of the Brooklyn Bridge could create a "Brooklyn Bridge" channel and use a tablet device such as an iPad or their computer to create a digital photo frame which would show them an ever-changing view of a their favorite landmark. The user could adjust settings on their "channel" to only show Brooklyn Bridge photos taken by friends, or only those taken within 500 feet of the bridge, or only those taken at night, or any combination of a number of other configurable options. Users will have the ability to share their personalized "channels" with other users.

For landmark events, then, the system of the present disclosure enables formatting of such content such that its delivery to a wireless picture frame, big screen display/ television, smart phone or tablet could serve as a means or form of live entertainment. Which events or landmarks an individual chooses for such service could drive all manners of targeted advertising.

Events entered in the database are provided with a set of parameters, including, for example:

| | |
|---|---|
| event . . . id | Identifies the event uniquely. |
| user . . . id | Identifies the user who created the event. |
| session . . . id | User session identifier for which the event is created. |
| name | Name of the event. |
| Description | Description of the event. |
| Cover | Cover photo identifier of the event. |
| meta . . . lat | Latitude of the event center. |
| meta . . . long | Longitude of the event center. |
| radius | Radius of the event for associating photos to the event in miles. |
| start . . . dt | Start date of the event. |
| end . . . dt | End date of the event. |
| event . . . access . . . type | Identifies whether the event is public or private. |
| create . . . dt | The database record created date. |
| update . . . dt | The database record updated date. |
| event . . . status . . . code | status of event (completed, drafted, active, etc.). |
| permission | event photo access permission for others. |

Additional parameters may be added to events. For example, for events with irregular GPS boundaries for which a simple radius around GPS coordinates is not appropriate, a parameter can be added which specifies the nature of the route of the event and an associated width around which images should be considered part of the event. Those of skill in the art will appreciate that other parameters may be associated with events.

Embodiments of the present disclosure span a wide variety of endeavors, covering many aspects of modern day life. Images captured at any and all events are potentially available to all users of the system, tailored and customized to the users' preferences.

Image Collection

When a user attends an event, the user may take images with her phone's camera, and upload the images to the system. Many mobile phones today include location information in tags of digital images, and this information allows the system to not only verify the origin location of the image, but also permits correlation of other users' images uploaded from the same event. Indeed, with improving GPS accuracy, the location of the uploading user may be identified to a specific seat when compared with a map of the stadium or arena in which the game is being played. The system of the present disclosure contemplates not only a web-based interaction with the network system, accessible via browsers on desktop and mobile devices, but also custom applications designed for use on computers and on mobile devices, the latter commonly known as "apps". Such custom applications interface with the camera on the device as well as the back end system, and may be designed to provide features unavailable to a web-based browser.

The particular location of events may provide additional opportunities for image collection, as stadiums and arenas may be equipped with cameras capable of being pointed at desired locations throughout the event. For example, the system of the present disclosure contemplates contracting with such venues to provide access by the system to such cameras (or installing them for the venue for use by the system of the present disclosure), such that images of users may be obtained by pointing the cameras to the users' known seat location, as provided by their GPS information. Alternatively, seat information may be provided by the user directly via their device. If necessary to help pinpoint the location of the user, maps of venues may be stored as a database in the system, which thereby will be able to direct cameras of venues to the correct location to collect images of the users, and upload them to the system.

The venue cameras used for the purposes described herein need not be stationary cameras. For example, the venue cameras may include airborne cameras, such as those mounted on drones or blimps. Systems and methodologies for using drones for this purpose are described, for example, in commonly assigned WO2016100601 (Gauglitz), which is incorporated herein by reference in its entirety.

Another source of images or media includes professional photographers, who may be contracted for their services or may be freelance. In either event, such photographers may, for example, take images of the event and upload them to the system. Additionally, such photographers may be provided with location information for registered users, in which case they may take images of such users, and upload them to the system. These images, which may be tagged with location information, may also be supplied by the photographer with information regarding particular users' locations which were photographed, such that the images will be available be available to each user. Different levels of privacy and security have been contemplated to limit the sharing of such photos with only those individuals who pay for those services.

The system then is enabled to allow registered users to have access to each other's images, thereby providing each user with a variety of angles on the action. Video (and audio) media is also contemplated as being included for use in the system. When a game concludes, the user has the ability to view her own images and/or listen to his audio files, or those of other users who attended the game and uploaded media to the system. Additionally, users may be presented with images taken by the venue's own cameras, or by professional photographers present at the event. Further, as discussed more fully below, because the system is in communication with other service providers, the user may choose to purchase digitally optimized and/or enhanced versions of any of those images by indicating such desire to purchase on the mobile application's interface.

Uploading to the system may be performed in any way capable of transferring images from a device to the system. For example, mobile phones ordinarily provide network connections via HSDPA, GSM, GPRS, EDGE, EVDO, CDMA, OFDMA and the like. Any of these protocols is suitable for transfer of images, and are thus useful transfer mechanisms. Additionally, Wi-Fi is available on many devices, including many mobile phones, and generally provides a faster transfer mechanism for uploading images. Images may also be transferred after an event, for example, when a user transfers images from an image capture device to a computer which then employs its ordinary internet connection (Wi-Fi, ethernet, etc.) to transfer images to the system.

Inclusion of images captured with a DSLR (digital SLR) camera or other source hardware that does not have GPS capabilities may also be enabled by the system. A variety of methods are suitable to verify the authenticity of such images. For example, a user may launch the system's app on a smartphone while at an event. The app may be provided with a means to have a user register as present at that event, for example, by providing a button to generally register for the event or even to register for the specific purpose of uploading from a non-GPS enabled device. Activating such a means for registration informs the system to expect that user will have images to upload from their account to the same event, which have not been GPS verified. When verifying authenticity for system-wide events, a user must still have been present at the event and "checked in" or "registered" in order to be permitted to upload photos and then subsequently link them to said public event. The photos may be flagged as not being GPS verified/authenticated; however, until someone from the community flags them as not belonging, they will be considered every bit as bonafide as an image uploaded with properly GPS stamped .exif data. The system has the ability to allow those who wish to see only verified images to filter those that are not fully verified from view.

The system of the present disclosure also permits the use of information about the direction from which images were captured. In a mapping app (such as GoogleMaps or others) view, the use of vectors to show to users not only where the photo was taken, but in what direction the camera was facing when the photo was captured could be provided. Such information is also useful for photo-stitching, as well as the ability to identify events within events (for example, a fistfight breaking out in the stadium stands.) Thus, the system enables aggregation of images that were taken from a particular location (e.g., section 102, row F, seat 21) but also photos that were taken from anywhere in the portion of a stadium facing left field, or the pitcher's mound, or the goal posts, or the cheerleaders section, etc.

On the same mapping view, in another embodiment of the present disclosure, a user drags a positional marker to assist sorting photos by proximity. When the marker is at a particular position, only photos captured within a specifiable distance of the marker are shown or highlighted, with additional images being further sorted by distance from the marker.

In another embodiment, the system may include a car mounted camera that captures images of the road and the driver at a defined interval, and uploads them to the server. If a car had this system installed and an accident were to occur, photos taken just prior to the accident may prove valuable in determining the cause and nature of the accident. Had those same photos been stored only on the device itself, they may have been destroyed in the accident. Additionally, if such a system-equipped car were ever stolen, photos of the thief and the surrounding area could aid in the recovery of the car as well as in the prosecution of the crime. Had the photos been stored only on the device, as opposed to safely on the server, these photos would most likely be destroyed before the car was ever recovered.

Car manufacturers have integrated multiple cameras in and around automobiles, from rear-facing cameras which aid in parallel-parking to side-view mirrors to minimize blind-spots. As more and more outward-facing cameras are integrated throughout the body, significant opportunities exist to photo-stitch images at will, at pre-defined moments or when other sensors communicate to the collective group of cameras that there is an interest or need to do so. Such photos could automatically be uploaded to one's insurance carrier for purposes of preserving an accident scene. The opportunity further exists to buffer said images in memory such that some number of images frames leading up to, for the duration of, and seconds thereafter, are captured and automatically uploaded to the network for preservation and archival purposes.

In another embodiment, the system may be provided with a Breaking News feature. Rather than being destined for a regular event, the system app deployed on the capture hardware (e.g., a smartphone) is capable of marking an image to be uploaded as "urgent". The system may then flag such events to human operators who will decide whether their urgency meets requirements to be considered a breaking news event. Additionally, truly newsworthy images and video clips may be listed on a photo exchange where news organizations (such as AP, Reuters, UPI, Fox News and CNN) may be provided access to the media.

As an example of the breaking news feature, two users are sitting outside at a cafe across from the Federal Reserve when a van pulls up and several armed, masked men exit. Both users launch their system app. User #1 proceeds to take X number of photos of the men running from the scene while User #2 takes a fifteen second video of the car making its getaway. A button within the app allows each of the users to designate their particular content as "BREAKING NEWS" before uploading same. This content is evaluated by human operators and determined to be fit for a breaking news event and/or directed to the media exchange accessible to news gathering organizations. The system may also provide a mechanism allowing the content creator to participate in revenue sharing system if/when their content is purchased.

Apps Running on Capture Devices

An application or "app" may be used on a device for capturing, uploading, and viewing images, and for interacting with the system. For example, an Android® or iOS® application that could be deployed and used on a mobile phone, or an Android® platformed camera. There are a wide variety of platforms for which applications may be developed and deployed including other phone operating systems and digital camera platforms.

The constructed app allows the operator to interact with the system in a way that facilitates the capture of images in a way useful to the system. For example, the app allows the user to "check-in" to an event, perhaps chosen from a personalized list of events local to the user and identified by the user's current location as provided by the device. Upon "check-in" the application will capture available sensor data from the device to associate with each image as it is captured by an image capture application, such as a camera app, on the device. The sensor data will be translated into GPS coordinates and device orientation information which can then be translated into an image vector to identify where the camera was pointing. This information can be used by the system later for purposes as discussed further herein.

The application is capable of sending images captured with the associated captured sensor data while the user is checked into an event to the system over any available network connectivity available to the device. These images and data will be added to the event data for use as configured for the event by the event owner.

The application also allows the user to view events from the event database and all event related content as well as targeted advertising generated by the system. Users are able to browse events and view event images and data on the device. Targeted advertising based on event details and user profile data may be rendered commingled with event data and images.

The application also allows users to interact with the system to create and edit events and associated event data. The application will provide methods for inputting information required to describe an event, leveraging GPS data from the device to set event coordinates when possible. The app communicates this information to the system over a network to allow the event data to be saved and made available to the user population in the manner configured for the event. The application will also allow users to like, share, comment, and perform other actions against event image data through user interface methods provided on the device.

The application allows the user to interact with the system to create and edit personal profile data used by the system to personalize the user experience. The app provides methods for providing personal interests and other user information for use by the system to present to the user events that may be of interest to the user, alerts on upcoming events local to the user, and targeted advertising.

The application also provides the user with alert capabilities, to present notifications for new content for already subscribed events of interest, the impending start of local and other events of interest, as determined by user profile and previous user interactions. These notifications may be used to open events and view event data as well as to check-in to events.

The application is also enabled to display the user's home page and events associated therewith, in addition to other events available through the interface. The content may be displayed on the device itself, or may be wirelessly sent to display devices, such as televisions, using known DLNA technology or the like, including AirPlay to an AppleTV device connected to a television.

Post-Upload Processing

The system may be made aware of the device which recorded the images, because images are tagged when uploaded to the server with information regarding the device, date and time, location, and the like. Such tag information may be provided by the device itself in many cases, however, where the device does not provide such tags, the user may elect to designate particular devices with the users' profile on the system. In this way, the system knows that the images uploaded by such a user were produced by the device indicated in their profile.

The system may thus also be provided with programmed information about how best to enhance and otherwise optimize the images produced by particular devices to produce superior images and extract the finest image quality possible from such devices. Such enhancement may be automatically applied to the images as they are uploaded to the site, although, to conserve processor power, the enhancement may be performed at later times, such as when the images are selected for output to a product.

Such digital enhancement of images is known to those of skill in the art, however, such enhancement techniques have not been applied automatically and for output to photographic products as contemplated by the present disclosure. Instead, such enhancement techniques have been used in standalone image manipulation programs. It is expected that a variety of image enhancement technology may be applied to the images gathered by the system of the present disclosure.

Such enhancement may be applied automatically upon upload, provided sufficient processing power, or may be applied only upon selection of an image for product output.

The systems and methodologies disclosed herein may use any of a variety of image enhancement technology, such as that disclosed in U.S. Pat. Nos. 6,885,766, 6,954,549, 7,020,330, 7,103,228, and US Patent Application 2004/0086176, each of which is incorporated herein.

In another embodiment, and particularly where all images are enhanced as they are uploaded to the database, the enhanced images may be provided to the arena's staff such that images may be shown in the displays in the stadium. Additionally, enhanced images may be provided to wired and satellite broadcasters for delivery to consumers as a stream to their computer screens, or televisions. Such delivery may take the form of picture-in-picture displays, or may be made available on additional alternative channels.

Using GPS, date/time information, phone orientation at the time of image capture, and other data which is presently (or may at some future time) be included in an image's exif or metadata, the system has the ability to identify relevant photos for purposes of photo-stitching. The resulting high-resolution panoramic digital images may be viewed by users, and may be output to printed or other physical products.

Events may also be based not on fixed or dynamically varying locations, but on the target of the images comprising the event. For example, an event may be created and shared wherein a politician delivering a speech is followed after the speech for interviews, and all images uploaded during a particular time frame, regardless of the actual location, are attached to the event. Similarly, a quarterback at a football game could be its own event, which includes images from the game itself as well as post-game interviews.

Product Creation

Many devices store images on memory cards, such as CompactFlash, SD, and the like. While users may transfer images directly from the capture device, where network connection speeds are not sufficiently rapid, users may prefer to simply transfer images to a computer for upload. Similarly, in one embodiment, users may bring their memory cards to an upload station or kiosk in an arena, which provides a suitable location for uploads for users. Such a kiosk may be an output producer, as discussed below, or may be an upload station designed merely for such uploads.

In one embodiment, single photographs, of a variety of sizes, may be purchased, or the user may select a plurality of photographs to be presented in a photobook, or calendar, or the like, as a keepsake of the event. Other products include greeting cards, postcards, posters, mugs, shirts, and many other products suitable for placement of a photograph. Such purchase instructs the system to direct a service provider to output professionally produced photographs in the format chosen by the user. Where photographic products are desired, any suitable service provider may be used, such as HP, Kodak, Shutterfly or Fujifilm. Additionally, where professional photographers also participate with the system, a user may opt to include such professional images individually, in an album, in a calendar, or the like. Such professional output may be priced accordingly higher than the user's own photographs, or those of other users attending the game.

In one embodiment, the output products are mailed to the user, so that the user receives the keepsake a day or two after the event has concluded. Alternatively, in another embodiment, the service provider maintains a production unit at the game venue, so that at the end of the game, the user may purchase the output product immediately.

When the user selects images for output in a product, the user may be presented with the enhanced versions of the chosen images, such that the user can see a preview of the product with the digitally enhanced images already prepared.

While the system of the present disclosure contemplates application to a wide variety of major league sports events, it is equally applicable to local events, school events, and organized youth sports. For example, where a little league baseball league (or team) desires to use the system, pages are constructed on the website and in mobile applications where users who are members of the league may follow the league's games. At each game, users may upload photographs of the game, and, just as with major league events, users may purchase professionally produced photographs, albums, calendars, and the like. The system thus accomplishes several objectives: it allows users to obtain customized professionally produced photographic products from their own images as well those of other league member users, professional photographers, and where available, cameras at the venue itself; it allows for viewing of such images on mobile devices as well as desktop computers, laptops, netbooks, tablets and various other displays such as televisions and wireless picture frames; and it may replace the need for teams to hire photographers for keepsake photographs of the teams and players.

Users need not even be capturing their own images at the event, because users will have access to images taken by other users, professional photographers, and venue cameras, from which to design and purchase a product.

In one embodiment of the present disclosure, images uploaded by users are tagged by the users with a status, either private, to be held in the user's account alone, or public, to be shared with the community. The public status may offer further granularity, in that it may be public to the event's community, or public to the website as a whole.

With each event, the database archives all the images for the event, thereby allowing users to view the images and order products immediately after the event, or days, months, even years later. The system grows as more events are added to the database, so that entire seasons of events are available to users. Thus, users may "mix and match" to format their desired products. For example, a user may select twelve images from different events to create a calendar, with an image chosen for each month.

A variety of templates may be made available on the system, but users may also save as templates products they create, and designate them as public in the same way photographs may be so designated, so that the community shares in the creativity of its users. Such templates may be offered to the public, or the system can be provided with a means for user-created templates to be available to other users for a fee. Such fee may be shared by the owner of the system with the user who created the template, thereby providing a mechanism by which users who create templates share in the benefits provided to the entire community. Further, the ability to track which/whose photos are used in the creation of printed photo products allows the system to also compensate contributors for their content.

Other embodiments, uses, and advantages of the present disclosure will be apparent to those skilled in the art from consideration of the specification and practice of the systems and methodologies disclosed herein. The specification and examples should be considered exemplary only. The intended scope of the invention is only limited by the claims appended hereto.

EXAMPLES

The present disclosure will be further understood by reference to the following non-limiting Examples. For purposes of these Examples, the system of the present disclosure has been provided with a name, to wit, PicPocket®.

Example 1

An Embodiment of the Disclosure, as Applied to a National Sporting Event

Each user may customize their copy of the installed mobile PicPocket® app on their device for listings of events taking place within a particular geographic radius, a time frame, by user or by keyword. In this example, football fan users have registered, and installed the PicPocket® app on their iPhones®, Android® devices and Blackberrys®. The app lists events fitting the set criteria, and the user may tap the items listed for further information. Users may also access the server for searching for events based on type of event, organization, dates, geographic locations, and other relevant criteria. Coming within close (or user defined) proximity of an event, or at nearing the starting time of an event, having specified a previous interest in being alerted to said events, the system app may alert a user to the fact that an event is or will be taking place. The ability to purchase tickets or get directions to said event would be possible given the current system.

In this Example, registered PicPocket® users attend a football game, such as the Philadelphia Eagles versus the Dallas Cowboys at Lincoln Financial Field in Philadelphia. Upon arrival at the stadium, the users find their way to their seats and get ready for the game by launching the application previously installed on their mobile phones, such as iPhones®, Android® devices and Blackberrys®. The PicPocket® app launches, and each user is presented with a screen customized with information relevant to their user accounts. For those users who previously identified either the Eagles or the Cowboys as a team to follow, an alert appears informing them that there is a game about to take place. For those whose GPS units are activated, for example, the PicPocket® system recognizes that they are in fact at the game.

The users take photographs during the game, (which are either uploaded in real-time or saved to be uploaded at some future time), and designating each photograph (individually, as a group of images or in total) as private or public. Upon upload, the system determines the location from which the photograph was taken based on the location tags found in the digital image file, if present. Date and time stamp information, also found in tags in the file, are also collected by the system. The model of mobile device taking the photograph is also either tagged in the digital photographic files, or is input by the user as part of the user account or entered upon launching of the application on the device. Handset orientation at the instant of photo capture may also optionally be captured for purposes of further delineating what the user was interested in photographing.

The PicPocket® system is aware of the device which recorded the images, and thus may optimize the images, extracting the finest image quality possible from such devices.

In the case of devices having tappable touchscreen interfaces, the application has tappable areas to review images already taken, those uploaded, those designated private and those designated public. Another tappable area links to photographs taken by other users at the game, showing thumbnails of others' public photographs. The name of the user who uploaded the photograph may (or may not) be listed below each thumbnail. Tapping on the thumbnail opens a page showing all public photographs uploaded by that user. Each photograph has a tappable area which the user can tap to save it for use in photographic products to be purchased later. Each image may also be rated by the users, allowing for an additional tappable area which leads to the most highly rated images. While the basic operation of the application has been described for a touchscreen interface, other interfaces may be employed which rely on selection with buttons or the like.

An indicator may be present in one area of the screen showing how many other users are using the system at an event. Another tappable area can be tapped to bring up a schematic view of the stadium, with indicators showing where other uploading users are located.

Users continue to take images, and upload them to the system. Additionally, professional photographers take and upload images, both images of the game itself as well as images of particular users, tagged with the users' name, location, or other data tag capable of indicating which user was imaged. The stadium also has cameras trained on the game and the seats, and in cooperation with the owner of the system of the present disclosure, and optionally for a fee, these cameras are pointed at registered users throughout the game, capturing images and uploading them to the system with a tag indicating which user was imaged. The system is then able to associate all images of any particular user with that users' account, and thus provide all images a user may be interested in when the user reviews images for purchase of products.

Personalized photographic products may be created through the mobile device application using a variety of templates made available to the application, as well as personalized templates created by the user, whether such templates have been created on the web and sent to the device by the server's front end, or even created on the mobile device itself through a feature of the application. In some embodiments of this example, a user may offer a personalized photographic product for sale to any others in the network, for which that user would receive a percentage of such sales. Such transactions may be handled by the system.

Some users may decide to order products during the game, for example, a T-shirt with a favorite image already captured by the user or another user, a coffee mug with such an image, or a photobook. Other users may wait until they get home to review the events' images on the website, and prepare a more formal photobook. Either way, the purchase choices are made, payment information is entered, and the transaction proceeds. The system directs products to be created by third party vendors from the images chosen by the user, however, the images are first enhanced such that maximum quality images are used for the production of such products. Products are then prepared and shipped to the users' home within a few days.

An additional element of the system includes the ability to create products at the event itself from the image database of the system. For example, a photographic product company has a kiosk at the stadium, and is enabled to print T-shirts, mugs, enlargement photographs, and optionally calendars, photobooks, and other products. The kiosk also has a computer connected to the internet, such that registered users with memory cards may upload to the system at any time, and such that the kiosk has access to the images in the database.

Users who order product items may select to have the items printed at the stadium, for a fee which may be different from the fee charged for items produced and shipped to their homes. Thus, one user orders an enlargement of a favorite image taken during the first quarter, and during halftime he proceeds to the kiosk where he picks up the enlargement. Another user orders a T-shirt just before halftime, and picks up the T-shirt later during the game. In either case, the images may have been enhanced such that maximum quality images are used to prepare the end products.

Example 2

An Embodiment of the System Applied to a Local Sporting Event

AYSO soccer Team A and Team F are set to play on a certain date and time on a field known in advance. Before PicPocket®, some number of parents from both teams who ordinarily took photos of their sons and daughters throughout the game, would have to be constantly running the length of the field to get the best shots possible. At the request of another parent (stranger or friend), these same parents may have been asked to share those same photos after the game-accomplished by either uploading them to an Internet service such as Flickr or emailing them directly to the individual(s) who requested them—but whose request, more than likely, would have been ignored or forgotten. At halftime when the teams switched sides, this same parent may have either been advantaged or disadvantaged depending on which side of the field their child was now playing on. With PicPocket®, a parent wants to tell another parent from both Team A and Team F about the service and the app because it ensures that with more people taking pictures at the same live event, the likelihood that each of the parents get better pictures of their children increases substantially. Worth noting is that the capability exists such that if the game has to be moved from one field to another, following being set up as an event ahead of time with a specific date, time and GPS coordinates, the PicPocket® system easily moves the GPS envelope to accommodate the new field by adjusting the game's GPS parameters in the event database, by taking into effect the location of PicPocket® users on both Teams A and F. Parents will have the ability to decide which photos they upload and settings associated with the uploads, which can be set by default or change on an event-by-event basis.

Example 3

An Embodiment of the System Applied to a Concert

A concert attendee is alerted to the fact that either one of their favorite bands, or a band which PicPocket's® use of predictive intelligence decides is similar, is playing at a nearby venue. The concert is an event in PicPocket's® event database. PicPocket® users are able to purchase tickets for the concert and map directions to the venue in addition to seeing which of their PicPocket® friends may or may not attend. At the concert, a PicPocket® user with backstage passes has a completely different photo experience than someone at the foot of the stage, or from someone in box seats overlooking the stage, or someone perched in the balcony. Yet all PicPocket® users attending the event and capturing images, and uploading them to the system, are able to enjoy all the different perspectives because the event page for the concert is populated with pictures captured by many users throughout the venue.

Example 4

An Embodiment of the System Applied to a Municipal Event

The PicPocket® system was deployed live for three days at the Austin City Limits outdoor music festival in October 2012. In addition to designating a catch-all GPS zone to cover all of Zilker Park, separate, and in most cases, mutually exclusive GPS hotspots, were established around the GPS coordinates of the individual stages where bands performed. Every photo that was taken during the event by a PicPocket® user, and within the GPS envelope of Zilker Park, was linked to the catch-all event/repository. Likewise, photos which were taken within the designated proximity of any of the individual stages were also linked to those particular stages/events.

Example 5

An Embodiment of the System Applied to Real Estate and Other Relocation Services A realtor may ask a potential client (i.e., a home buyer) to describe what they are looking for in a neighborhood—from a home's proximity to schools, parks, medical facilities, etc. to certain price-points. A realtor may use this information to identify homes using a system such as MLS, and then designate said homes to be included in a dashboard view of properties that can be searched, sorted, Liked, commented on and shared like any other "event" within the PicPocket® system. The realty application will identify where individual properties are located on an online map alongside other PicPocket® events which may or may not have been selected based on a user's stated PicPocket® Profile interests.

Example 6

An Embodiment of the System Applied to a User-Created "Owned" Personal Event with Controlled Access A father decides to use PicPocket® to aggregate images of a birthday party for his ten year old son. The father launches the PicPocket® app and selects the 'Create Event' option, designating the event type as 'birthday' and setting the date, start time and duration. He uses his handset to name the event "Timmy's $10^{th}$ birthday" and walks outside to the middle of his backyard and chooses 'Set Location.' Aided by a map (GoogleMaps or other), he draws a perimeter around his home in free form mode or uses a slider bar to increase the radius around the point where he is standing until such time that he feels that he has adequately encompassed the area where the event will take place. Once he commits the GPS coordinates and the resulting proximity envelope, he is prompted to invite attendees from his smart phone's address book and social network lists. A separate email is sent to him (and/or others he may designate) with a web interface that allows them to continue to refine the Invite list from their handset, tablet or PC. The email or SMS invite notes that "Timmy's $10^{th}$ birthday" is a PicPocket® supported event and may provide a description of PicPocket® and a link to download the app.

The day of the birthday party, the PicPocket® app reminds attendees of the event. The app may provide directions to the event. Once someone who has the app on their phone comes within some distance of the GPS coordinates for the event, the app wakes up and may ask a user if they would like to confirm attendance at said event. Once users are within the GPS envelope, images are tagged as belonging to the PicPocket® system's "Timmy's $10^{th}$ birthday" event, and in keeping with the app's settings, images will either directly upload to the designated online directory belonging to said event, or users will be able to choose which photos to send on a case-by-case basis by selecting them from within the app. If a user has previously configured the PicPocket® app to only upload when a Wi-Fi signal is present, while they may still be able to designate which photos to upload and which to keep Private, the actual upload will be delayed until a Wi-Fi signal is available.

For individuals who show up to the event without a prior Invite, the Event creator can provide them with a passcode that provides visibility and access to the "Timmy's $10^{th}$ birthday" event. The passcode will only be valid when the user is within the GPS envelope during the date/time of the on-going event. Similarly, a parent who does not have a smart phone, or who prefers instead to use a DSLR camera, would also need this same passcode and another identifier in order to log in later to be able to upload images which may or may not have been date and time stamped and which are missing GPS coordinate information. As Invitees commit their images to the event in real-time or shortly thereafter, Timmy's parents have the ability to choose which photos from the rich content pool specific to the birthday event to share with all of the individuals invited to, or who participated in, the event.

Example 7

An Embodiment of the System Applied to a Dynamically Location-Based Event(s) Using GPS, and Also Including the Option of Non-Regular (i.e., Noncircular) Regions The Macy's Thanksgiving Day Parade is an annual three hour event held in NYC attended by nearly four million people and viewed by over 50 million worldwide. In recent times, the parade kicks off at $77^{th}$ Street and Central Park West in Manhattan and continues south to Columbus Circle where it turns east onto $59^{th}$ Street then south down Sixth Avenue to $34^{th}$ Street, making its final stop at Macy's Herald Square—a nearly three miles long journey.

Between areas restricted from public viewing and the sheer enormity of the parade route, no one individual can expect to get the best photos of the event by simply maintaining their position along the parade route, regardless of their vantage point.

The picture of Kermit the Frog with Columbus Circle as a backdrop is an enviable photo, but a picture of Superman and Hello Kitty tangled up in high winds across from Macy's Herald Square would be just as interesting. If you're standing outside braving November weather to take photos of this event, you're clearly very interested in all the goings-on of this event.

PicPocket's® coverage of the Macy's Day Parade begins with creation of the event in the event database, and establishes a GPS envelope to include an area encompassing a specified width to the left and right of the center of the parade route so that pictures from anywhere along the parade route could be made available in real-time to users subscribing to the event.

Example 8

An Embodiment of the System Using Targeted Advertising in any Event

PicPocket's® ability to target Internet advertising to the specific interests of both its users as well as companies desiring to generate impressions or actual sales is focused on, but not limited to, three main areas: 1) Promotion and Sponsorship of events, 2) Affiliate Product Sales and 3) what is commonly known as Internet ads. In the case of item (1), since PicPocket® is able to intercept all the photos taken at a live event before they are sent anywhere else, and because the community of PicPocket® is able to rate the photos, the best photos of any event (for purposes of this Example, the Superbowl) rise to the top of the event bucket. Having collected some number of the best photos of the cheerleaders, the mascots, the tailgating parties, the crushing tackles, the half-time show and all the antics happening in the stands and on the field (to name just a few areas of interest), brands with an interest promoting themselves at big ticket events or events which are related to their marketing spend or business development activities will want their brands prominently displayed at the top of the event in question just as the big brands spend $4 million per thirty-second ad on network television.

PicPocket's® coverage of Superbowl XLVII led PicPocket® to intersperse product ads relevant to: the event itself (Superbowl), the teams who were competing (San Francisco 49'ers, Baltimore Ravens), and the general items of interest with regard to the sport of football, the NFL, and major league sports in general. Product ads were created which linked to an e-commerce storefront's API (in this case, Amazon) for such licensed NFL branded products as official team jerseys, helmets, footballs, and collectibles/memorabilia.

Example 9

An Embodiment of the System Using Perspectives from Time and Space

PicPocket® has the capability to use a point in space and time to search for photos. With each photo the system has its position when taken and its orientation so it can determine if a point is in the field of view. Using this information, a 360 degree view of a point in time may be created that allows a user to use drag controls to see all angles. The control could allow zoom and individual photos could be zoomed to match the perspective and distance to the object/scene. For example, a controversial play in an NFL game presents an opportunity to explore the specific point and time it took place, search for and display all the relevant photos and/or videos from a variety of perspectives, and drag and zoom to see all angle/details available.

Additionally, a user could view all of the images of a given perspective taken across time. The user employs a timeline/scroll/progress bar to drag the temporal perspective across all available values for a given view. For example, all of the images taken from a general area in the stands of Yankees stadium from a single game may be aggregated, and then stitched together to form an ersatz movie. Zoom of individual images taken along the same vector could be used to fill in any gaps created as a result of missing photos from the particular location.

As the PicPocket® system gathers more and more data from a given location (e.g., Yankee stadium), information from that location may be used as a reference to geotag images missing such information, allowing PicPocket® to process content created before GPS technology was wide spread.

The PicPocket® system may also use similar images taken at approximately the same time and along the same vector to create higher quality images than any of the source images. Additionally, photo-stitching software may be used to create ultra high resolution photos of famous locations by crowdsourcing all of the individual images. The PicPocket® app may inform the user in real time where to position and aim the camera in order to fill in missing areas, and may offer incentives to users to fill in such missing pieces. The PicPocket® app may be equipped with a feature called 'group photo'. At a pivotal moment in the game, or at a random time, PicPocket® system sends smart phones at an event a message/prompt to let users know that in five-four-three-two-one seconds . . . HOLD YOUR PHONE IN THE AIR AND POINT IT AT CENTER FIELD! A group-photo from every imaginable seat (angle/perspective) in the venue, all at the same time, that may be photo-stitched together for a 2D or 3D model. Users can opt in or out to be alerted by PicPocket® or to participate in group photos.

Example 10

An Embodiment of the Disclosure Using Encryption

In most digital photos, GPS information and other metadata such as time, orientation, altitude, etc., are typically stored in a standardized, unencrypted format in the photo's exif data. An advantage of this lack of encryption is that the data captured and stored by one device can be read by another, unrelated device. The disadvantage is that the user storing that data has no control over who can read, share, and use this potentially private information. For example, a user might want to share several pictures from her vacation without revealing to everyone who sees them exactly where and when the pictures were taken. To solve this problem, the system may allow users to save GPS and other relevant data with the photo in such a way that the system will still able to aggregate these photos by time and location while keeping this private information private.

One technique is to store the data as an encrypted string as part of the photo's unencrypted exif data. Someone viewing the photo on another device might see there was encrypted data stored with the photo, but without the proper decryption information, they would not be able to view the private information.

Another, more secure approach to hiding private information in a photo would be to store that data inside the image itself in such a way that no one viewing or examining the photo would know private information was there at all.

In addition to storing GPS and other relevant metadata with the photo in a private, secure manner, the system may use similar techniques to intentionally hide secret text or audio messages and promotions inside photos and ask users to hunt for the secret message by examining a series of photos with a virtual magnifying glass. Users who were able to decode the secret messages would be entitled to a reward such as free or discounted products or services.

Example 11

An Embodiment of the Disclosure Using Target Based Events

While many events are time and place focused, as discussed above there are static "Landmark events" which focus on a particular place irrespective of the time. But events may also be target specific, such as an event based on an individual, such as a politician, or a celebrity, or a sports figure.

It will be appreciated that the systems and methodologies disclosed herein provide various advantages over the prior art. For example, these systems and methodologies provide unique advantages and opportunities to parties who wish to engage in targeted advertising. In particular, many existing methods for targeted advertising rely on demographic information gathered from consumers, or on the search histories or clickstreams of online users. Such information may not provide deep, meaningful insight into what a consumer wants or needs, because it frequently lacks proper context. The systems and methodologies allow advertisers to utilize location, date and time to associate consumer behavior with a unique event, thus providing additional insight into how individuals spend their time and dollars. This information may be utilized to serve up highly targeted, event specific promotions or sponsorships and related or relevant merchandise.

Various modifications are possible to the systems and methodologies disclosed herein. For example, while the geographic boundaries used to define events in some of the systems and methodologies disclosed herein have sometimes been treated as two-dimensional objects, it will be appreciated that the teachings herein may be readily expanded to volumetric, higher dimensional (e.g., three-dimensional), spaces, or "geospaces".

Similarly, while the systems and methodologies disclosed herein have frequently been described with respect to static events (that is, events whose geographic boundary does not change as a function of time), these systems and methodologies may also be applied to dynamic events, such as events defined with respect to a moving target. Examples of such events are described, for example, in commonly assigned WO2016112052 (Gauglitz), entitled "Use Of A Dynamic Geofence To Control Media Sharing And Aggregation Associated With A Mobile Target", which is incorporated herein by reference in its entirety.

Similarly, while the systems and methodologies disclosed herein have frequently been described illustrated with respect to media capture using mobile phones or hand-held cameras, it will be appreciated that, in some embodiments, these systems and methodologies may utilize imaging devices mounted on aircraft, such as drones. Examples of such systems and methodologies are described, for example, in commonly assigned WO2016100601 (Gauglitz), entitled "Drone Based Systems And Methodologies For Capturing Images", which is incorporated herein by reference in its entirety.

While the systems and methodologies disclosed herein have frequently been described with reference to their use in capturing and aggregating media, it will be appreciated that these systems and methodologies may be used more generally to capture and aggregate data. By way of example, participants to an event occurring at a particular venue may be equipped with wearable devices that collect data. Thus, for example, basketball players in a basketball game being held at a basketball court may be equipped with devices or sensors which capture or record data pertaining to the players or the game such as, for example, the amount of time a player has been on the court, the height of jumps, the distance a player has traveled in a game, the player's heart rate, the number of shots a player has taken, and the like. This data may then be aggregated using the methodologies disclosed herein, and utilized for various end use purposes.

The present disclosure is not to be limited in scope by the specific embodiments described above, which are intended as illustrations of aspects of the present disclosure. Functionally equivalent methods and components are within the scope of the present disclosure. Indeed, various modifications of the systems and methodologies disclosed herein, in addition to those shown and described herein, will become apparent to those skilled in the art from the foregoing description. Such modifications are intended to fall within the scope of the present disclosure. All cited references are hereby incorporated by reference.

The invention claimed is:

1. A system for associating media with an event, comprising:

a server equipped with a processor and non-volatile computer-readable memory and having an event database stored in the non-volatile computer-readable memory which contains a plurality of events, wherein each of the plurality of events has a temporal window and a geofence associated with it; and a software application provided in a second non-volatile computer-readable memory and distributable to a plurality of mobile technology platforms, each of which is equipped with a display, an input device, and a further non-volatile computer-readable memory capable of storing a copy of said software application, wherein the copy of said software application, when installed in the further non-volatile memory, provides instructions to a further processor associated with each of the plurality of mobile technology platforms to:

communicate with the server;

monitor the current location of the mobile technology platform; and capture media in response to at least one command input to the mobile technology platform;

wherein the server is configured to:

receive, from at least one of said plurality of mobile technology platforms, a request to modify an instance of media captured on the at least one of said plurality of mobile technology platforms;

ascertain whether the at least one of said plurality of mobile technology platforms is present at one of said plurality of events by: (a) comparing the location of the at least one of said plurality of mobile technology platforms with the geofence associated with the one of said plurality of events, and (b) comparing the current time with the temporal window associated with the one of the plurality of events; and if the at least one of said plurality of mobile technology platforms is present at the event, then: (a) creating a modified version of the instance of media, and (b) providing the modified version of the instance of media to the at least one of said plurality of mobile technology platforms.

2. The system of claim 1, wherein the server is configured to associate a temporal window with each created event by receiving input from a first one of said plurality of mobile technology platforms that specifies the temporal window to be associated with the event.

3. The system of claim 1, wherein the server is configured to associate a geofence with each created event by receiving input from a first one of said plurality of mobile technology platforms that specifies the geofence to be associated with the event.

4. The system of claim 1, wherein each received request to create an event is generated by said copy of said software application that is associated with the at least one of said plurality of mobile technology platforms making the request.

5. The system of claim 1, wherein the copy of said software application associates each instance of captured media with the time and location at which the media was captured.

6. The system of claim 1, wherein at least one of said plurality of mobile technology platforms is a hand-held device.

7. The system of claim 1, wherein at least one of said plurality of mobile technology platforms is a mobile phone.

8. The system of claim 1, wherein at least one of said plurality of mobile technology platforms is a camera-watch.

9. The system of claim 1, wherein said captured media is an image.

10. The system of claim 1, wherein said captured media is selected from the group consisting of images, video, and audio.

11. The system of claim 1, wherein each of said plurality of mobile technology platforms is associated with a social network and uses the copy of the software application to share media pertaining to events with the social network.

12. The system of claim 11, wherein the media pertaining to events is shared over a website associated with the social network.

13. The system of claim 11, wherein each of said plurality of mobile technology platforms can be associated with an account on said social network.

14. A system for associating media with an event, comprising:
a server equipped with a processor and non-volatile computer-readable memory and having an event database stored in the non-volatile computer-readable memory which contains a plurality of events, wherein each of the plurality of events has a temporal window and a geofence associated with it; and
a software application provided in a second non-volatile computer-readable memory and distributable to a plurality of mobile technology platforms, each of which is equipped with a display, an input device, and a further non-volatile computer-readable memory capable of storing a copy of said software application, wherein the copy of said software application, when installed in the further non-volatile computer-readable memory, provides instructions to a further processor associated with each of the plurality of mobile technology platforms to:
communicate with the server;
monitor the current location of the mobile technology platform; and
capture media in response to at least one command input to the mobile technology platform;
wherein the server is further configured to:
define the geofence;
define the temporal window;
create a media template;
detect the presence, within said geofence and during said temporal window, of a first mobile technology platform; and
generate a display of the media template on said first mobile technology platform in response to the detection of the presence of said first mobile technology platform within said geofence and during said temporal window.

15. The system of claim 14, wherein the server is further configured to:
upload the media template to said first mobile technology platform in response to the detection of the presence of said first mobile technology platform within said geofence and during said temporal window;
apply the template to an instance of captured media on said first mobile technology platform in response to a selection made on said first mobile technology platform, thereby creating a modified version of the captured media; and
display the modified version of the captured media on said first mobile technology platform.

16. The system of claim 14, wherein defining the temporal window associated with one of the plurality of events includes receiving input from a further one of said plurality of mobile technology platforms that specifies the temporal window to be associated with the one of the plurality of events.

17. The system of claim 14, wherein defining the geofence associated with one of the plurality of events includes receiving input from a further one of said plurality of mobile technology platforms that specifies the geofence to be associated with the one of the plurality of events.

18. A system for associating media with an event, comprising:
a server equipped with a processor and non-volatile computer-readable memory and having an event database stored in the non-volatile computer-readable memory which contains a plurality of events, wherein each of the plurality of events has a temporal window and a geofence associated with it; and
a software application provided in a second non-volatile computer-readable memory and distributable to a plurality of mobile technology platforms, each of which is equipped with a display, an input device, and a further non-volatile computer-readable memory capable of storing a copy of said software application, wherein the copy of said software application, when installed in the further non-volatile computer-readable memory, provides instructions to a further processor associated with each of the plurality of mobile technology platforms to:
communicate with the server;
monitor the current location of the mobile technology platform; and
capture media in response to at least one command input to the mobile technology platform;
wherein the server is configured to:
create an event database containing a plurality of events, wherein each of the plurality of events in the event database has a temporal window and a geofence associated with it;
determine whether one of said plurality of mobile technology platforms is present at one of said plurality of events by: (a) comparing the location of the one of said plurality of mobile technology platforms with the geofence associated with the one of the plurality of events and (b) comparing the current time with the temporal window associated with the one of the plurality of events; and
if the one of said plurality of mobile technology platforms is determined to be present at the one of said plurality of events, then:
send, to the one of said plurality of mobile technology platforms, a template associated with the event;
receive a request from the one of said plurality of mobile technology platforms to apply the template to at least one instance of media captured by the one of said plurality of mobile technology platforms; and
in response to the request, apply the template to the at least one instance of media captured by the one of said plurality of mobile technology platforms, thereby generating a modified version of the instance of media captured by the one of said plurality of mobile technology platforms.

19. The system of claim 14, wherein defining the temporal window associated with one of the plurality of events includes receiving input from a further one of said plurality of mobile technology platforms that specifies the temporal window to be associated with the one of the plurality of events.

20. The system of claim 14, wherein defining the geofence associated with one of the plurality of events includes receiving input from a further one of said plurality of mobile technology platforms that specifies the geofence to be associated with the one of the plurality of events.

* * * * *